(12) United States Patent
Ouyang et al.

(10) Patent No.: US 12,506,657 B2
(45) Date of Patent: Dec. 23, 2025

(54) RESOURCE SCHEDULING METHOD FOR COMPUTING FORCE NETWORK

(71) Applicant: ASIAINFO TECHNOLOGIES (CHINA), INC., Beijing (CN)

(72) Inventors: Ye Ouyang, Beijing (CN); Aidong Yang, Beijing (CN); Xiaozhou Ye, Beijing (CN); Boquan Cheng, Beijing (CN); Mohan Wu, Beijing (CN)

(73) Assignee: ASIAINFO TECHNOLOGIES (CHINA), INC., Beijing (CN)

( * ) Notice: Subject to any disclaimer, the term of this patent is extended or adjusted under 35 U.S.C. 154(b) by 106 days.

(21) Appl. No.: 18/283,029

(22) PCT Filed: May 26, 2022

(86) PCT No.: PCT/CN2022/095280
§ 371 (c)(1),
(2) Date: Sep. 20, 2023

(87) PCT Pub. No.: WO2023/225952
PCT Pub. Date: Nov. 30, 2023

(65) Prior Publication Data
US 2025/0039046 A1    Jan. 30, 2025

(51) Int. Cl.
*H04L 41/0826* (2022.01)
*H04L 41/142* (2022.01)
*H04L 45/302* (2022.01)

(52) U.S. Cl.
CPC ........ *H04L 41/0826* (2013.01); *H04L 41/142* (2013.01); *H04L 45/308* (2013.01)

(58) Field of Classification Search
None
See application file for complete search history.

(56) References Cited

U.S. PATENT DOCUMENTS

| | | | |
|---|---|---|---|
| 2017/0048744 A1* | 2/2017 | Egner | H04W 28/0268 |
| 2019/0190802 A1 | 6/2019 | Jalali et al. | |
| 2020/0036624 A1* | 1/2020 | Michael | H04L 43/0876 |
| 2020/0076675 A1* | 3/2020 | Morariu | H04L 41/5009 |

FOREIGN PATENT DOCUMENTS

| | | |
|---|---|---|
| CN | 113079218 A | 7/2021 |
| CN | 113364850 A | 9/2021 |
| CN | 113448721 A | 9/2021 |
| CN | 113709048 A | 11/2021 |

* cited by examiner

*Primary Examiner* — Fadi Haj Said
(74) *Attorney, Agent, or Firm* — Dickinson Wright PLLC

(57) ABSTRACT

A method of resource scheduling in a computing force network, wherein the computing force network includes at least one node among which at least one forward path exists, and the method includes the following steps: for each of the at least one node, acquiring node performance indicator of the node based on resource indicators of the node and at least one influence node related to the node; for each of the at least one forward path, acquiring path performance indicator of the forward path based on the performance indicators of nodes constituting the forward path; and in response to a business requirement for the computing force network, selecting at least one optimal forward path from the at least one forward path based on the forward path performance indicators of the at least one forward path.

18 Claims, 11 Drawing Sheets

```
            ┌─────────────────────────────────────────┐
            │  for each of the at least one node included in the │
            │  computing force network, acquiring node performance │
            │  indicator of the node based on resource indicators of │ S102
            │  the node and at least one influence node related to the │
            │                    node;                 │
            └─────────────────────────────────────────┘
                              │
            ┌─────────────────────────────────────────┐
            │  for each of the at least one forward path included in │
            │   the computing force network, acquiring forward path │ S104
            │  performance indicator of the forward path based on the │
            │     performance indicators of nodes constituting the │
            │                 forward path            │
            └─────────────────────────────────────────┘
                              │
            ┌─────────────────────────────────────────┐
            │       in response to a business requirement for the │
            │  computing force network, selecting at least one optimal │ S106
            │   forward path from the at least one forward path based │
            │   on the forward path performance indicators of the at │
            │                least one forward path   │
            └─────────────────────────────────────────┘
```

Fig. 1

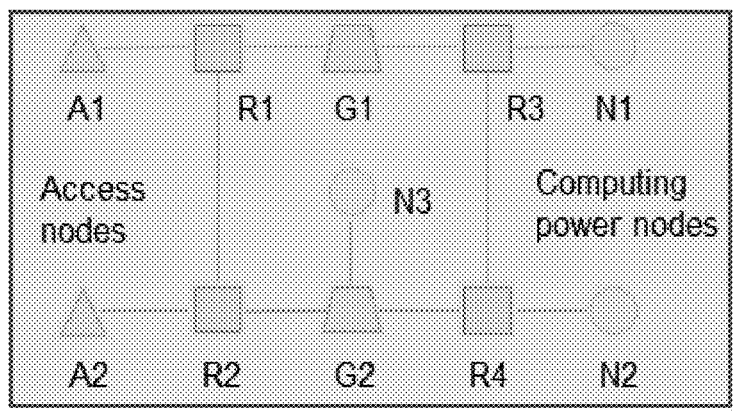

Fig. 2 acquiring a curve mapping between resource indicators and performance indicators of the node acquiring a resource value corresponding to a specific performance indicator point on the curve as the resource constraint for the node Topology of Computing force network

RESOURCE SCHEDULING METHOD FOR COMPUTING FORCE NETWORK

CROSS-REFERENCE TO RELATED APPLICATION

The present application is a national phase application of PCT/CN2022/095280 filed May 26, 2022, which is hereby incorporated by reference in its entirety.

FIELD OF PRESENT DISCLOSURE

The present disclosure relates to scheduling of network resources and computing resources, in particular to scheduling of computing force network resources.

BACKGROUND

Computing power is a kind of new productive force in the digital economy era, and serves as a solid foundation to support the development of digital economy. The key resources in the digital economy era include data, computing powers and algorithms, among which data serves as new means of production, computing powers serve as new productive forces, and algorithms serve as new relations of production, which constitute the most basic foundations for production in the digital economy era. Based on unified management of computing powers and network, a computing force network can realize deep integration of computing capabilities and networking capabilities, and belongs to a new type of information infrastructure that provides high-quality services for business. The key to provide high-quality services by the computing force network is to arrange and schedule computing resources and network resources for the network in a unified way, and dynamically generate end-to-end forward paths in the computing force network that meet business requirements, according to business requirements and strategies.

DISCLOSURE OF THE PRESENT DISCLOSURE

It is an object of the present disclosure to provide improved scheduling of computing force network resources and computing resources for a specific data business, and the present disclosure can reach such an object by appropriately estimating performances of nodes and/or forward paths included in the computing force network, and additionally or alternatively, by constituting a more appropriate and comprehensive evaluation function for the forward paths included in the computing force network, so that optimal forward path(s) included in the computing force network can be determined for meeting the data business requirement.

According to a first aspect of the present disclosure, there is provided a method of resource scheduling in a computing force network, wherein the computing force network comprises at least one node among which at least one forward paths exist, and the method comprises the following steps: for each of the at least one node included in the computing force network, acquiring node performance indicator of the node based on resource indicators of the node and at least one influence node related to the node; for each of the at least one forward path included in the computing force network, acquiring forward path performance indicator of the forward path based on the performance indicators of nodes constituting the forward path; and in response to a business requirement for the computing force network, selecting at least one optimal forward path from the at least one forward path based on the forward path performance indicators of the at least one forward path.

According to a second aspect of the present disclosure, there is provided an electronic device for resource scheduling in a computing force network, wherein the computing force network comprises at least one node among which at least one forward paths exist, and the electronic device comprises a processing circuitry configured to: for each of the at least one node included in the computing force network, acquire node performance indicator of the node based on resource indicators of the node and at least one influence node related to the node; for each of the at least one forward path included in the computing force network, acquire forward path performance indicator of the forward path based on the performance indicators of nodes constituting the forward path; and in response to a business requirement for the computing force network, select at least one optimal forward path from the at least one forward path based on the forward path performance indicators of the at least one forward path.

According to a third aspect of the present disclosure, there is provided a non-transitory computer-readable storage medium storing executable instructions that, when executed, cause implementation of the method as described in the embodiments of the present disclosure.

According to a fourth aspect of the present disclosure, there is provided a device which includes a processor and a storage device, and the storage device stores executable instructions that, when executed, cause the processor to implement the method as described in the embodiments of the present disclosure.

According to a fifth aspect of the present disclosure, there is provided a computer program product containing executable instructions that, when executed, cause implementation of the method as described in the embodiments of the present disclosure.

According to a sixth aspect of the present disclosure, there is provided an apparatus comprising means for implementing the method as described in the embodiments of the present disclosure.

According to a seventh aspect of the present disclosure, there is provided a computer program containing executable instructions that, when executed, cause implementation of the method as described in the embodiments of the present disclosure.

This section is provided to introduce some concepts in a simplified form that will be further described below in the detailed description. This section is not intended to identify key features or essential features of the claimed subject matter, nor is it intended to be used to limit the scope of the claimed subject matter. Other aspects and advantages of the technology will become apparent from the following detailed description of the embodiments and the accompanying drawings.

DESCRIPTION OF THE DRAWINGS

The above and other objects and advantages of the present disclosure will be further described below with reference to specific embodiments and with reference to the drawings. In the drawings, the same or corresponding technical features or components will be denoted by the same or corresponding reference symbols.

FIG. 1 illustrates a flowchart which shows a method of resource scheduling in a computing force network according to the embodiments of the present disclosure.

FIG. 2 illustrates a schematic view of an exemplary topological structure of a computing network.

Figure 3:
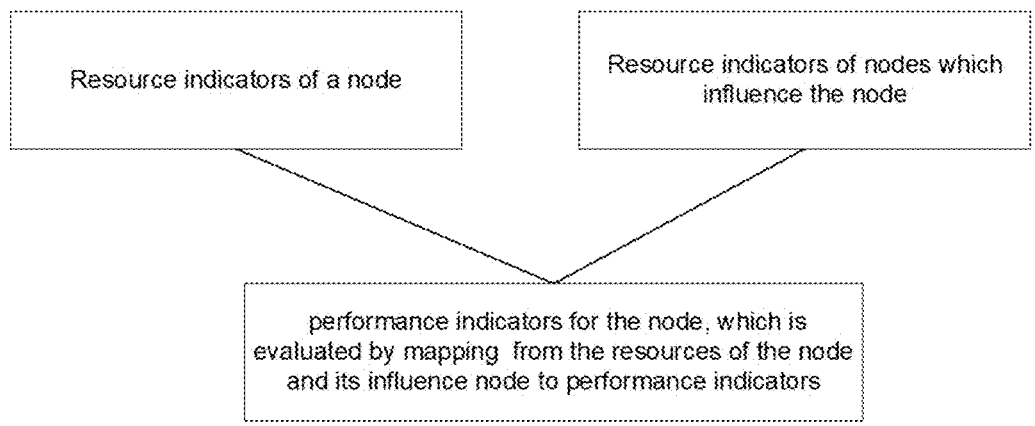
FIG. 3 illustrates a process of evaluating performance indicators for a node according to the embodiments of the present disclosure.

The embodiments described in this section may be susceptible to various modifications and alternative forms, and specific embodiments thereof are shown by way of example in the drawings and are described in detail herein. It should be understood, however, that the drawings and detailed description thereof are not intended to limit the embodiments to the disclosed particular forms, but rather, the intention is to cover all modifications, equivalents, and alternatives falling within the spirit and scope of the claims.

DETAILED DESCRIPTION OF PREFERRED EMBODIMENTS

Hereinafter, exemplary embodiments of the present disclosure will be described with reference to the accompanying drawings. For clarity and conciseness, not all features of an embodiment are described in the specification. However, it should be understood that many implementation-specific settings must be made during the implementation of the embodiment in order to achieve specific goals of the developer, for example, to meet those restrictions related to equipment and business which may change depending on the implementation. In addition, it should also be understood that, although development work may be very complex and time-consuming, it is only a routine task for those skilled in the art benefiting from this disclosure.

Here, it should also be noted that, in order to avoid obscuring the present disclosure by unnecessary details, only processing steps and/or equipment structures that are closely related to at least the solution according to the present disclosure are shown in the drawings, while other details of little relevance to this disclosure are omitted.

At present, there exists some solutions for arranging and scheduling resources in a computing force network.

One solution relates to a slicing type edge computing power management method. The solution can slice computing power resources in accordance with some criteria, and manage distribution of the computing powers based on the slices. In operation, for an external demand, a corresponding slice can be selected and the computing power resources that need to be utilized can be selected for the slice. The solution is characterized by slicing the external demand and actual computing power resources, which can reduce the system complexity to some extent.

However, this solution has a disadvantage that the added slicing system cannot explicitly select computing power resources according to task requirements, such as the lowest latency, the lowest consumption, etc. Meanwhile, this solution only considers the slicing of computing power resources, but pays no attention to other nodes such as transport nodes.

Another solution relates to a hierarchical computing force network arrangement method, device and storage medium. In this method, a regional computing force network arrangement module is utilized to manage some local computing power resources, and the computing power information is collected and uploaded to an end-to-end computing force network arrangement module. When a user's request for computing power is received, a corresponding list of computing force network resources is returned to the user, so that the user can select required computing power nodes and then perform end-to-end forward path arrangement. The solution is characterized in that network scheduling and resource scheduling in each region is handled by a local arrangement module, which reduces the processing complexity of the local system.

However, this solution has a disadvantage that the central end-to-end computing force network arrangement module still needs to consider information about all computing power nodes instead of the information about local areas, so the actual arrangement complexity is not decreased. Meanwhile, this solution can only select computing power nodes, but lack any control for the forward paths, so that an optimal forward path selection cannot be achieved.

Yet another solution relates to a dimensional measurement method, a computing power resource scheduling method and a storage medium for intra-network resources. The method comprises the steps of obtaining a first node computing power, a second node computing power and an absolute computing power evaluation value of any network node in a computing force network through the dimensional measurement, and obtaining a relative computing power evaluation value of any network node in the computing force network through the computing power resource scheduling method. Then the obtained evaluation value can be used for deciding the resource scheduling for the computing force network. The method is characterized by quantitatively evaluating each node and then performing resource scheduling according to the quantization result, which makes the resource scheduling scheme more direct and clearer.

However, the solution has a disadvantage that only the first and second node computing powers are calculated, and node allocation and resource scheduling are carried out according to the computing power evaluation value. This solution only considers the evaluation of nodes, but lacks the evaluation of the whole end-to-end links, the latter being a factor in a practical application which affects user services more directly. And the measurement and evaluation of computing force network node resources in this solution can not directly map the performance indicators of nodes, and can not evaluate the boundaries of security performances of nodes.

In view of the above, the present disclosure provides improved arrangement and/or resource scheduling for a computing force network. In the present disclosure, for at least one task/business/application, the arrangement and/or resource scheduling in a computing force network may actually relate to arrangement and/or resource scheduling of appropriate nodes included in the computing force network, particularly selection/determination of appropriate forward path(s) including nodes in the computing force network to satisfy/meet at least one specific task/business/application requirement. Please note that the expression "and/or" may mean that the at least one of the terms or operations as recited before or after the expression "and/or", while verb or noun terms before or after the symbol "/" may be equivalent to each other and can be used exchangedly in the context of the specification.

In one aspect, the present disclosure can acquire or evaluate business-related performance of a node included in the computing force network in consideration of at least one node which may influence the node, particularly, the performance of a node can be evaluated based on resources of the node and other nodes. Therefore, the performances of nodes can be more appropriately and accurately evaluated based on association/influence among nodes, instead of the nodes alone.

In another aspect, the present disclosure can evaluate performance of a forward path constituted by nodes included in the network based on the evaluated performances of the nodes, so that the performances of forward paths included in the computing force network can be more appropriately and accurately evaluated.

In yet another aspect, additionally or alternatively, for resource scheduling/arrangement of computing force network, a comprehensive evaluation function is constituted in consideration of multiple performance characteristics which may be associated with multiple types of businesses/applications, particularly by weighted combining the multiple performance characteristics, wherein the weights can be appropriately set with respect to a specific type of business or business requirement, without needing reconstitution of a new function. Therefore, based on such a comprehensive evaluation function as a cost function, at least one optimal path for a specific business requirement can be determined accurately and efficiently.

Hereinafter, embodiments of the present disclosure will be described. Note that the concept of the present disclosure can be equivalently and effectively utilized to a variety of businesses/tasks/requests, such as any other appropriate intelligent services which may relate to various data processing services; various system management services; or the like.

Note that the concept and embodiments of the present disclosure will be described with respect to a computing force network which aims to optimize scheduling of computing forces and/or resources, such as nodes, paths, etc. included in the network for a task/business/service/requirement, and such computing force network can be any kind of know and to-be-known network which may have equivalent functionalities, regardless of the expression or abbreviate of such a network, for example, Computing Power Network (CPN) in ITU-Y. 2501, which is a new type of network that realizes optimized resource allocation, by distributing computing, storage, network and other resource information of service nodes through a network control plane (such as a centralized controller, distributed routing protocol, etc.), Computing Aware Networking (CAN) in ITU-TD835, which is in the scope of cloud computing and is the enhancement of network of cloud computing to support the integration of cloud and network resources, Computing First Network (CFN) in IETF which leverages both computing and networking status to help determine the optimal edge among multiple edge sites with different geographic locations to serve as a specific edge computing request, Computing Force Network (CFN) which is proposed to achieve the computing and network joint optimization based on the awareness, control and management over computing resources in the context of IMT-2020 and beyond and is required to enable the use of AI/ML related capabilities, and so on. And the scope of the present application will not affected/influenced by the expression/abbreviation of the network in which the solution of the present application is implemented. FIG. 1 illustrates a method of resource scheduling in a computing force network according to some embodiments of the present disclosure, wherein the computing force network comprises at least one node among which at least one forward paths exist.

As shown in FIG. 1, in the method 100, in step S102, for each of the at least one node included in the computing force network, acquiring node performance indicator of the node based on resource indicators of the node and at least one influence node related to the node; in step S104, for each of the at least one forward path included in the computing force network, acquiring forward path performance indicator of the forward path based on the performance indicators of nodes constituting the forward path; and in step S106, in response to a business requirement for the computing force network, selecting optimal forward path(s), particularly an optimal forward path or an optimal forward path combination, from the at least one forward path based on the forward path performance indicators of the at least one forward path.

The nodes in a computing force network, referred to as nodes for short hereinafter, may include a variety of types of nodes, for example, network access nodes, network transport nodes, gateway nodes, computing nodes, also called computing power points and computing power nodes, etc. As shown in FIG. 2, A1 and A2 are access nodes, R1-R4 are transport nodes, G1 and G2 are gateway nodes, and N1-N3 are computing nodes. Of course, the nodes in the computing force network are not so limited, and other kinds of network nodes may be also included. A forward path may generally begin with an access node and end at a computing node included in the computing force network along the topological structure of the computing force network, optionally via any intermediate nodes, such as transport nodes, gateway nodes, etc.

According to some embodiments of the present disclosure, a node may perform any appropriate operation, for example data processing, for a task/business based on resources, particularly any appropriate resources available for data processing, for example physical resources, network resources, time or frequency resources, or any other appropriate resources, and the resources can be indicated by a resource indicator, which may mean information about the resources for the nodes, may be a form of vector and each element in the vector may correspond to a kind of resource, and the performance achievable by the node's operation can include a variety of performances, particularly performance characteristics depending on the type or requirement of the business or the node type, such as latency, packet loss rate, packet transmission success rate, and so on, and can be indicated by a node performance indicator, which may be a form of vector and each element in the vector may correspond to a kind of performance characteristic. In an example, the performance of a node can be indicated by Key Performance Indicator (KPI). The performance of a forward path can be derived from performances of nodes included in the forward path, and can be also indicated by a forward path performance indicator, which can be also in the same form of the node performance indicator, such as KPI.

According to some embodiments of the present disclosure, the at least one node may include at least one access node and at least one computing node, and optionally at least one intermediate node between the at least one access node and the at least computing node, and the at least one forward path may include a forward path from one access node to one computing node, and for example, such a forward path may be a forward path directly from the access node to the computing node, or such a forward path may be a forward path indirectly from the access node to the computing node via at least one intermediate node. In some embodiments, the at least one node and at least one forward path whose performance indicators need to be acquired may be derived from all nodes and all forward paths from all access nodes to all computing nodes included in the computing force network. In some embodiments, such at least one node and/or at least one forward path may be derived with respect to the task/business, particularly in consideration of some constraints related to the task, such as the access node, computing node, intermediate node, forward path load, etc., if any. In an example, if any access node or computing node are pre-selected/pre-configured, the forward paths between the pre-selected/pre-configured access node and computing nodes and all nodes included in the forward paths, which can obtained/derived based on the topological structure of the network, may correspond to at least one forward path and the at least one node. In some embodiments, such at least one node and at least one forward path may be all nodes and forward paths included in the network, and then the operations can be performed based on such nodes and forward paths. In an example, such nodes whose performance indicators need to be acquired may particularly be intermediate nodes included in the network, such as transport nodes, gateway nodes, and any other appropriate nodes between the access nodes and the computing nodes.

According to some embodiments, acquiring node performance indicator of the node based on resource indicators can be equivalently to a kind of performance evaluation/mapping operation, that is, mapping from the network sources available for/usable by the node to the performance of the node which is achievable based on such network resources. In an example, the performance evaluation for a node can be equivalent to mapping from the resources of the node and its influence node to the performance indicator of the node, as shown in FIG. 3.

In the present disclosure, for a node, its influence node may mean a node which may affect the operation of the node during operation of the computing force network for the task/business. According to some embodiments, for a node whose node performance indicator is to be acquired, its at least one influence node is selected from nodes in the computing force network based on correlation between the node and other nodes in the computing force network. In some embodiments, the correlation between the node and other nodes in the computing force network may include at least one of position correlation, link/path correlation, community correlation between the node and other nodes in the topological structure of the computing force network. Equivalently, in some implementations, for a node, the influence nodes may refer to nodes included in an influence area for the node, which can be deemed as an area/sub-network conforming to such correlation, and thus, determination of influence nodes may be equivalently to determination of an influence area and the nodes includes in the influence area may serve as the influence nodes of the node.

In some embodiments, the influence nodes can be determined from the topology of the computing force network based on the correlation of nodes in a variety of manners, which will be described hereinafter. And in some embodiments, the influence nodes can be determined further based on business performance requirement such as accuracy requirement, speed requirement, and so on. In particular, which manner of determining the influence nodes to be utilized can be selected based on the business performance requirement, for example, which kind of correlation is utilized for determining the influence nodes can be selected based on the business performance requirement.

Figure 4A:
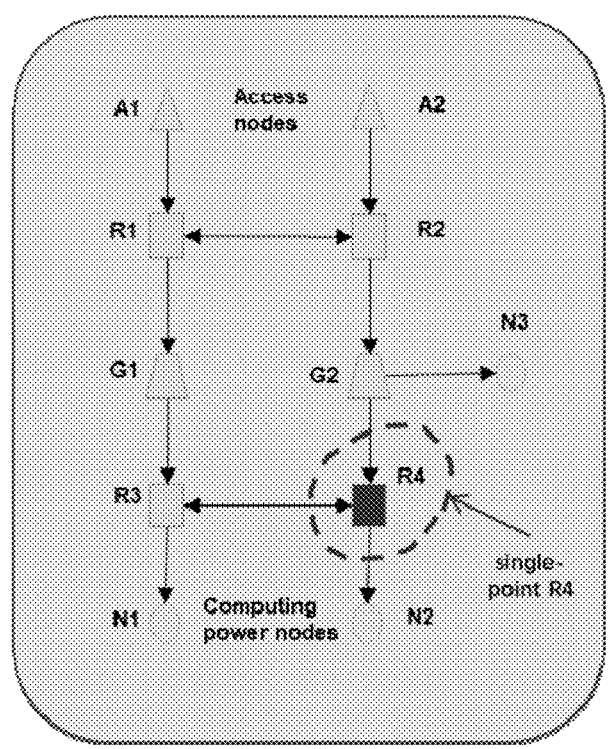
FIG. 4A to 4D illustrate exemplary influence nodes for a node in the computing force network according to the embodiments of the present disclosure.

In an embodiment, for a node whose node performance indicator is to be acquired, its influence node may be determined based on the position of the node, which can be determined based on any appropriate cutting in the topology, such as single-point cutting in which the influence node can be determined based on the node itself. In particular, the influence nodes, or equivalently the influence area can be determined based on single-point cutting. As shown in FIG. 4A, for a node R4, the influence node is R4 itself. In such a case, the performance evaluation for a node can be performed based on the characteristics of the node itself. The advantage of this method is that it is fast, but the accuracy is low, and most secondary information is lost. For example, it may be suitable for an application/business with high-speed requirement.

Figure 4B:
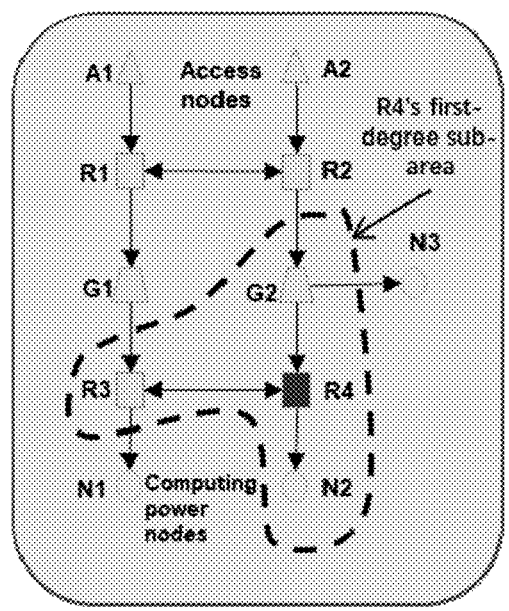

Alternatively or additionally, in an embodiment, for a node whose node performance indicator is to be acquired, its influence nodes may be nodes included in the computing force network which are in specific connection relationship with the node. In an embodiment, the influence nodes may be nodes the K degree relation of the node. Note that two nodes in K-degree relationship may mean there exists K−1 nodes connected between such two nodes in the topological structure of the computing force network, for example, first-degree relationship may mean two nodes connect with each other directly. In an example as shown in FIG. 4B, for the node R4, the nodes R3, G2, N2, which are included in the subnetwork other than the node R4 and the access nodes, the computing nodes, and which are in the first-degree relationship with the node R4, can be selected as influence nodes, and equivalently, the subnetwork enclosing such nodes, as indicated by the dash line, can be deemed as an influence area. The advantages of this determination manner are high speed, moderate accuracy and loss of secondary information. For example, it may be suitable for an application/business with high-speed requirement.

Figure 4C:
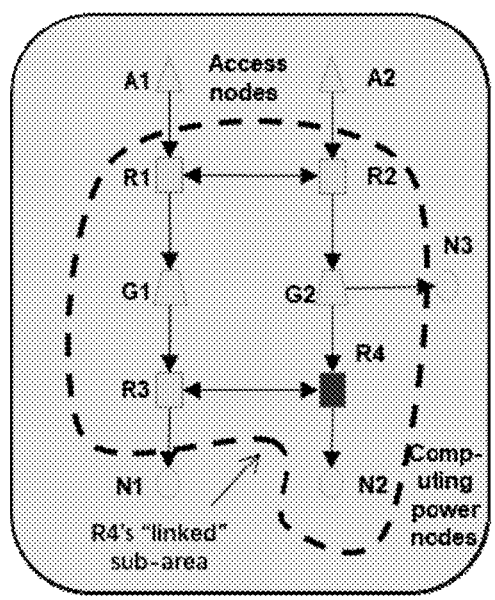

Alternatively or additionally, for a node whose node performance indicator is to be acquired, its influence nodes may be nodes in the computing force network which is in a specific link/path relationship with the node. Note that nodes in such a link/path relationship may mean such nodes can form a forward path between an access node and a computing node. That is, for a node, any node which is located in the same forward path between an access node and a computing node as the node belongs to the link relationship. As shown in FIG. 4C, for the node R4, the nodes R1, R2, R3, G1, G2, N2, which can form a forward path with the node R4, included in the subnetwork other than the node R4 and the access nodes, computing nodes, can serve as influence nodes, and equivalently, the subnetwork enclosing such nodes, as indicated by the dash line, can be deemed as an influence area. The advantages of this determination manner are high accuracy and complete information, but the speed is slow. For example, it may be suitable for an application/business with high accuracy requirement.

Figure 4D:
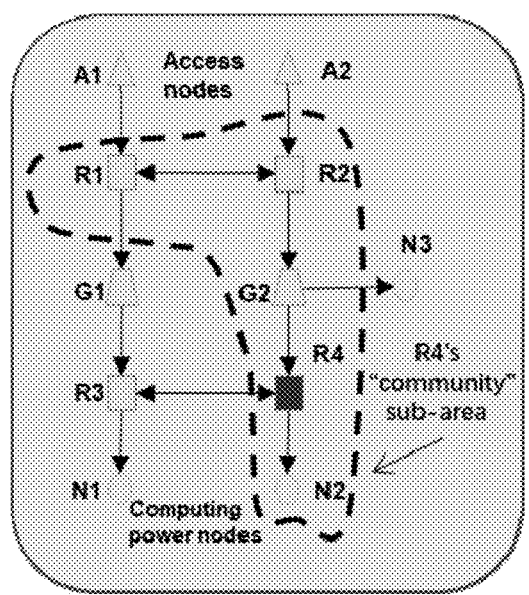

Alternatively or additionally, for a node whose node performance indicator is to be acquired, its influence nodes may be nodes in the computing force network which belong to the same community as the node. The community configuration may depend on the business type, business requirement, etc., and can be preset/preconfigured for the network or nodes therein. As shown in FIG. 4D, for the node R4, the nodes R1, R2, G2, N2, which are included in the subnetwork other than the node R4 and the access nodes, the computing nodes, can serve as influence nodes, and equivalently, the subnetwork enclosing such nodes, as indicated by the dash line, is the community to which the above nodes belong to, and can be deemed as an influence area. The advantages of this method are high speed and high accuracy, but a small amount of information will be lost. For example, it may be suitable for an application/business with high accuracy and high-speed requirement.

According to some embodiments of the present disclosure, the performance evaluation of the node can be implemented in a variety of manners. In some embodiments, the performance evaluation can be based on a performance evaluation model. In some embodiments, acquiring node performance indicator of the node may comprise performing performance evaluation by a performance evaluation model from resource indicators of the node and the at least one influence node to obtain an evaluation result as the node performance indicator of the node. In particular, the input of the performance evaluation model is the resource characteristics of the node and the influence nodes related to the node, and the output of the model is the evaluated performance indicator (KPI) of the node. Such model can be expressed in a variety of manners, and particularly can be equivalent to or expressed as a function of function of determining the performance indicators of the node from the resource characteristics, particularly a mapping function.

In an example, the node to be evaluated is represented by R4 as shown in FIG. 2, with its N resource indicators $Z_1^{R4}, \ldots, Z_N^{R4}$ and m KPIs are $KPI_1, \ldots, KPI_m$ respectively; its influence area has two nodes G2 and N2 as influence nodes, and their resource indicators are $Z_1^{G2}, \ldots, Z_N^{G2}, Z_1^{N2}, \ldots, Z_N^{N2}$ respectively, and the performance evaluation model can be expressed as:

$$f(Z_1^{R4}, \ldots, Z_N^{R4}, Z_1^{G2}, \ldots, Z_N^{G2}, Z_1^{N2}, \ldots, Z_N^{N2}).$$

According to some embodiments of the present disclosure, the evaluation model can be any appropriate model, such as a neural network model, deep learning model, etc. And the evaluation model can be trained/obtained by any appropriate training methods. In some embodiments, the evaluation model can be trained by using sample nodes, and the performance evaluation model can be trained by minimizing the difference between a node performance indicator of a sample node evaluated by the performance evaluation model based on the resource indicators of the sample node and a real performance indicator of the sample node. Such real performance indicator can be set or obtained in advance.

In an example, according to the resource indicators of sample nodes, performance indicators (KPIs) of sample nodes, and the topological structure of a network including sample nodes, a performance evaluation model can be created to comprehensively evaluate the relationship between resource indicators and KPIs of nodes. And the evaluation model can be trained with historical resource indicators and KPIs of sample nodes. The training goal is to make the evaluated/predicted KPIs from the model close to the real KPIs, such as the shortest distance between the evaluated/predicted value and the real value.

For example, the node to be evaluated is represented by R4 as shown in FIG. 2, with N resource indicators $Z_1^{R4}, \ldots, Z_N^{R4}$ and m KPI indicators $KPI_1, \ldots, KPI_m$; its influence area has two nodes G2 and N2, and their resource indicators are $Z_1^{G2}, \ldots, Z_N^{G2}, Z_1^{N2}, \ldots, Z_N^{N2}$, respectively, and the goal of training evaluation model is to minimize the difference between the model output and its desired/actual KPI values, as follows:

$$\left| f(Z_1^{R4}, \ldots, Z_N^{R4}, Z_1^{G1}, \ldots, Z_N^{G1}, Z_1^{N2}, \ldots, Z_N^{N2}) - (KPI_1, \ldots, KPI_m) \right|,$$

The evaluation model can be a neural network model, and the norm |·| is used to evaluate the gap/distance between the predicted value and the true value.

Therefore, the present disclosure can map resource indices of a node and all nodes in the influence area that affect the node to the KPI of the node, particularly by means of a capability evaluation model. By considering the influence nodes, the node's KPI can be evaluated more accurately. Moreover, the capability evaluation model can be flexibly constructed and expanded according to the task/business requirement, so that it is easy for the user to maintain and secondary develop the model, and the user's workload can be reduced.

According to some embodiments of the present disclosure, when resource scheduling in the computing force network, the method may further include, for each of the at least one node, determining a resource constraint for the node based on correspondence between resource indicators and performance indicators of the node.

In some embodiments, the resource constraint for the node may correspond to maximum resources available by the node which would cause the performance of the node to reach a performance threshold or would not cause the performance of the node to degrade substantially. In particular, such resource constraint may correspond to a resource boundary, particularly a safety boundary of resource consumption which also means the maximum guaranteed resource of the node, since at the boundary value, the performance degrades slowly, and if the resources utilized by a node exceed the boundary, the performance of the node may degrade significantly, and the safety of the network may be compromised.

According to some embodiments of the present disclosure, the correspondence between resource indicators and performance indicators can be expressed in any appropriate form, particularly a curve, and the resource constraint for a node can be determined as a resource value on the correspondence curve corresponding to a specific performance indicator for the node. In some embodiments, such a specific performance indicator may correspond to an inflection point of the performance indicator, a performance threshold, or a critical performance indicator beyond which the performance would degrade significantly, and can be found in the correspondence curve.

Figure 5A:
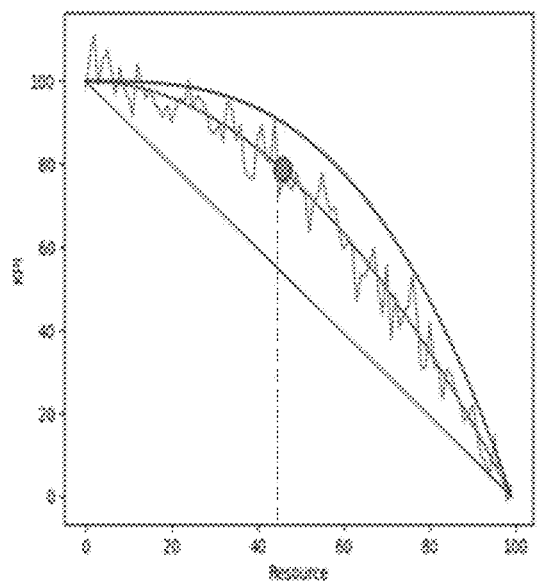
FIG. 5A to 5D illustrate exemplary curves and inflection points therein according to the embodiments of the present disclosure.
Figure 5B:
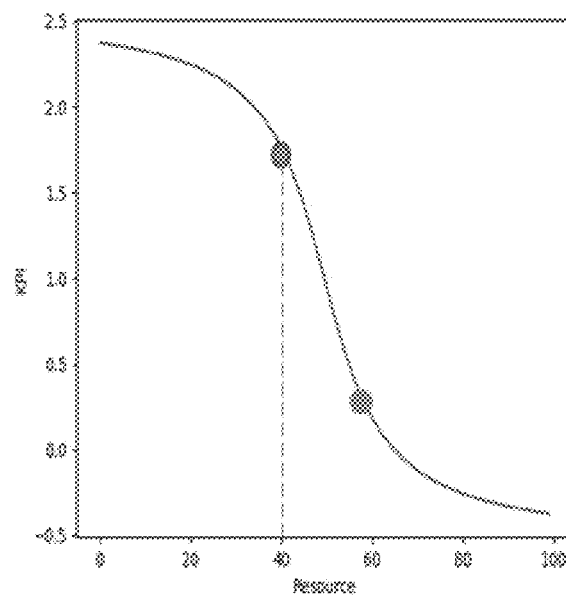
Figure 5C:
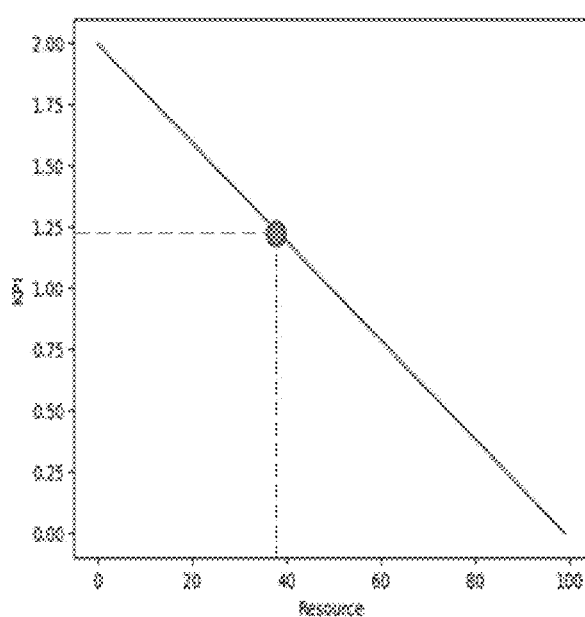
Figures 5D, 6A:
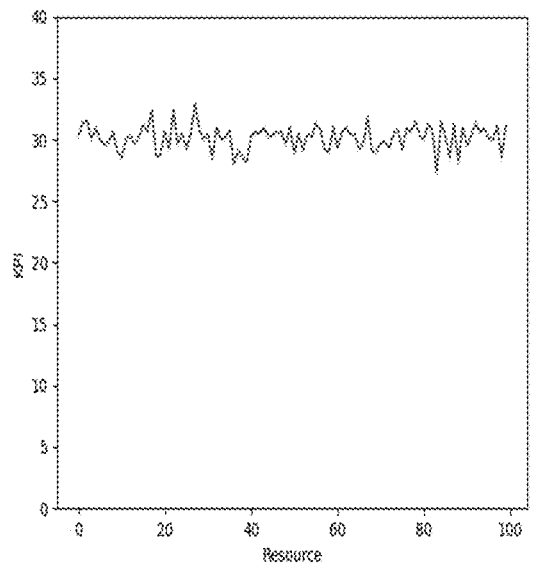
FIG. 6A illustrates a flowchart of determining a resource constraint for the node according to the embodiments of the present disclosure.

In some embodiments of the present disclosure, the determining a resource constraint for the node may comprise acquiring a correspondence curve between resource indicators and performance indicators of the node, and acquiring a resource value corresponding to a specific performance indicator point on the curve as the resource constraint for the node, as shown in FIG. 6A. Such correspondence curve can be obtained in a variety of manners, and particularly, can be obtained by means of the performance evaluation model as discussed above. For example, a set of resource indicators can be input into the model to obtain corresponding evaluated performance indicators and thus the curve can be derived from, such as by the fitted statistical models, the set of resource indicators and corresponding performance indicators. In some embodiments, such curve can be further smoothed.

According to some embodiments of the present application, the inflection point of the performance indicator can be appropriately determined in a variety of manners, particularly depending on the curve characteristic. In some embodiments, the specific performance indicator point may correspond to a specific performance inflection point in the curve under a condition that the slope of the curve changes, and in an embodiment, such a specific performance inflection point in the curve may correspond to a critical value of the slope change of the curve determined based on the probability distribution of the slope of the curve. The critical value has the following meaning: if the current occupied resources do not exceed the critical value, KPI will slowly decrease with the increase of resource consumption, and this node can be added to the optional node set available for the task at this time; If the current resource has exceeded the critical value, KPI will drop sharply with the increase of resource consumption, so it is not appropriate to schedule this node for the task/business at this time. In some embodiments, the specific performance indicator point may correspond to a performance threshold point in the curve under a condition that the curve is linear, and in an embodiment, the performance threshold point may correspond to an empirically set performance threshold point in the curve.

In some embodiments, the performance inflection point may be a specific inflection point in the curve and the resource value on the curve corresponding to the specific inflection point serves as the resource constraint. In an example, if there are one inflection point, as shown in FIG. 5A, the resource value on the curve corresponding to such inflection point can be determined as the safety boundary value, and if there are multiple inflection points, as shown in FIG. 5B, a specific inflection point can be selected therefrom, for example, a first inflection point can be selected, or can be selected through expert experience, and the resource value on the curve corresponding to such inflection point can be the determined safety boundary value. Such inflection point can be found from the curve in a variety of manners, such as mathematical analysis.

In some embodiments, under a condition that the relationship curve is linear, that is, the slope is almost constraint, as shown in FIG. 5C, the specific performance indicator point is a specific set point in the curve, which can be an empirically set performance threshold point in the relationship curve, or can be set based on the historical statistics, and so on, and the resource value on the curve corresponding to the specific set point serves as the resource constraint.

In some embodiments, the slope may be close to 0, the KPI is not affected by resources and there is no safety boundary, as shown in FIG. 5D. That is, in such a case, the constraints related to the resource boundary need not to be utilized for performance evaluation.

Figure 6B:
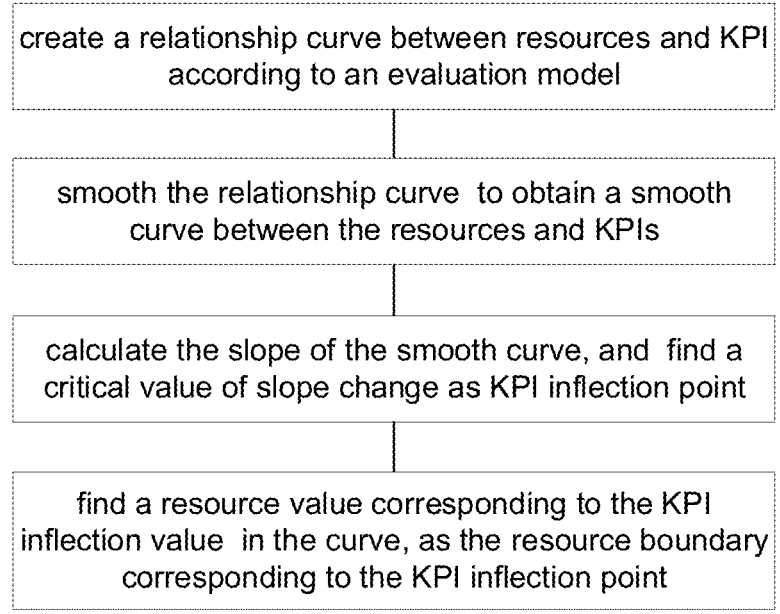
FIG. 6B illustrates a process of determining a safety boundary value related to resource consumption as a resource constraint for a node according to the embodiments of the present disclosure.

Therefore, the present disclosure can find a safety boundary of resource consumption for a node whose performance indicator is intended to be evaluated, particularly through the slope of capacity evaluation model, which is used to limit the use of node resources and prevent the node from collapsing. Therefore, the safety boundary value of resource consumption can be quantitatively determined by this modeling method, which is convenient for practical engineering operation. Hereinafter an exemplary process to determine the safety boundary value will be described which reference to FIG. 6B which is a flowchart illustrating determination of the resource boundary corresponding to the KPI inflection point for a node. Such process can be performed by means of any appropriate manners, and for example, can be performed via a model or function. The input of the model or function is the inflection point of KPI, and the output of function or model is the safety boundary value of resource consumption.

Firstly, the relationship curve between resources and KPI can be created according to an evaluation model. The evaluation model can be any appropriate model, for example, can be determined based on the performance evaluation model as discussed above, for example, may correspond to the inverse of the above performance evaluation model. And such relationship curve can be smoothed to obtain a smooth curve between the resources and KPIs. In some implementation, the curve can be smoothed in a variety of manners well known in the art, which will not described in detail herein.

Then, approximately calculate the slope of the smooth curve, and according to the probability distribution of slope, find the critical value of slope change, that is, KPI inflection point.

Finally, resource value corresponding to the KPI inflection value can be found in the curve, that is, the resource boundary corresponding to the KPI inflection point, as the constraints.

According to some embodiments of the present disclosure, the constraints can be determined for all nodes in the computing force network in advance, as discussed above, and stored for further usage. And the constraints can be stored in any appropriate form, such as a database, a table, etc. Therefore, during process, for a node, such table can be searched to determine the constraints corresponding to the node. In some embodiments, a basic table for node evaluation can be generated. In particular, use the node evaluation model to evaluate KPIs of all nodes in the computing force network, as well as optionally their safety boundaries, and generate a basic table for node evaluation, which may include the resource characteristics, KPIs, and optionally resource constraints corresponding to each other. The following table is an example of the basic table for node evaluation.

TABLE 1

| Nodes | Resource indicator Z | | | Performance indicator K | | | Saftey boundry B | | | Risk indicator | | |
|---|---|---|---|---|---|---|---|---|---|---|---|---|
| | $Z_1$ | $Z_2$ | $Z_3$ | $K_1$ | $K_2$ | $K_3$ | $B_{z1}$ | $B_{z2}$ | B | $N_{count}$ | $P_{probability}$ | Confidence |
| A1 | 10 | 5 | 3 | 0.1 | 0.3 | 0.7 | 20 | 8 | 6 | 0 | 0 | 99% |
| A2 | 9 | — | 2 | — | 0.4 | 0.6 | 18 | — | 7 | 1 | 0.1% | 99% |
| R4 | 0.35 | 0.73 | 100 | 0.3 | 1.2 | 0.9 | 0.8 | 0.95 | 80 | 2 | 0.2% | 99% |
| | | | | | ... | | | | | | | |

According to some embodiments, such constraints may be determined for the nodes to be evaluated as the performance evaluation is performed. That is, such constraints can be determined only with respect to the nodes for performance evaluation, instead of all nodes, and in such a case, the processing overhead can be reduced.

According to some embodiments, the performance evaluation for forward paths included in the computing force network can be carried out based on the performance evaluation of nodes included in the computing force network and associated with the forward path. In particular, the nodes associated with the forward path can mean nodes constituting the forward path in the topological structure of the computing force network, particularly intermediate nodes, such as transport nodes, gateway nodes, etc.

According to some embodiments of the present disclosure, the overall forward path performance indicator of the forward path can be derived/acquired based on the performance indicator of each node included in the forward path. In some embodiments of the present disclosure, the acquiring forward path performance indicator of the forward path comprising combining the performance indicators of all nodes included in the forward path to acquire the overall forward path performance indicator of the forward path.

In some embodiments, such combination can be performed in a variety of manners, and particularly, the performance indicators of nodes included in a forward characteristics of the nodes in the forward path to determine the overall forward path performance indicators of the forward path.

According to some embodiments, a node performance indicator of a node comprises at least one component corresponding to at least one type of performance characteristics, and the combining the performance indicators of all nodes may comprise combining the respective performance indicator components of the nodes in respective manners set in accordance with the respective performance characteristics. In particular, the combination manner for a performance indicator component may be a specific manner suitable for the type of corresponding performance characteristic, and may be the same as or different from that for another performance indicator component.

Figure 7:
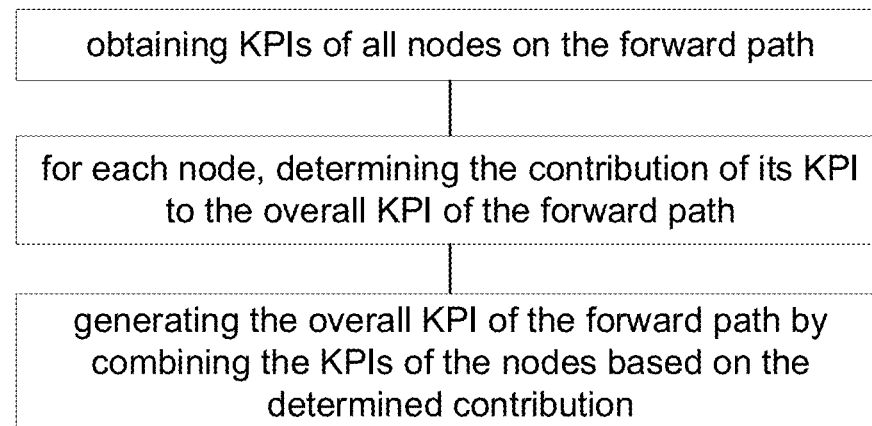
FIG. 7 illustrates a process of performance evaluation for a forward path according to the embodiments of the present disclosure.

Hereinafter an embodiment of performance evaluation of a forward path in the computing force network will be described with reference to FIG. 7. The performance indicator, such as KPI, for a forward path can be generated based on KPIs of nodes therein. More specifically, for the forward path, KPIs of all nodes on the forward path can be obtained, such as in the manner as discussed above, and for each node, the contribution of its KPI to the overall KPI g(•) of the forward path can be determined, such as, according to the characteristics of KPIs. That is, how the node's KPI contributes to the overall KPI of the forward path. For example, the latency is accumulated and the success rate is multiplied. Finally, the overall KPI of the forward path can be generated by combining the KPIs of the nodes based on the determined contribution.

Assuming that nodes d1, d2, ..., dn are all nodes of a forward path, $K_1^{di}$, $K_2^{di}$ indicate node latency and node packet transmission success rate of each node respectively, which belong to performance indicators (KPI) of the nodes, and the overall KPI of the forward path is as follows:

$$g(\cdot) = \left(K_1^{d1} + \ldots + K_1^{dn}, K_2^{d1} \times \ldots \times K_2^{dn}\right).$$

According to some embodiments of the present disclosure, a forward path evaluation table for all forward paths in the computing force network can be generated. More specifically, traverse all forward paths between access nodes and computing nodes in computing force network and evaluate their forward path KPIs, so that evaluation for all forward paths in the computing force network can be generated and stored in any form. In particular, a basic table for forward path evaluation can be generated in advance. The following table is an example of the basic forward path evaluation table.

TABLE 2

| Access node | Paths to the computing nodes | Computing nodes | Performance indicators K | | | Risk indicator R | | |
|---|---|---|---|---|---|---|---|---|
| | | | latency $K_1$ (ms) | Packect loss rate $K_2$ (ms) P | jitter $K_3$ (ms) | numbers of over safety boundaries N | Risk probability P | confidence C |
| A1 | A1<->R1<->G1<->R3<->N1 | N1 | 10 | 1% | 5 | 3 | 1% | 95% |
| A1 | A1<->R1<->R2<->G2<->R4<->R3<->N1 | N1 | 9 | 3% | 3 | 1 | 0.1% | 95% |
| A1 | A1<->R1<->R2<->G2<->N3 | N3 | 12 | 1% | 7 | 0 | 0.01% | 95% |
| A1 | A1<->R1<->G1<->R3<->R4<->G2<->N3 | N3 | 15 | 5% | 8 | 5 | 2% | 95% |
| A1 | A1<->R1<->R2<->G2<->R4<->N2 | N2 | 7 | 7% | 4 | 1 | 3% | 95% |
| A2 | A2<->R2<->G2<->R4<->R3<->N1 | N1 | 8 | 2% | 2 | 0 | 0.02% | 95% |

Of course, such performance evaluation for the forward path can be performed mainly with respect to any desired forward path as the performance evaluation is performed, instead of all forward paths in the network, in a similar way with that for the node.

Figure 8:
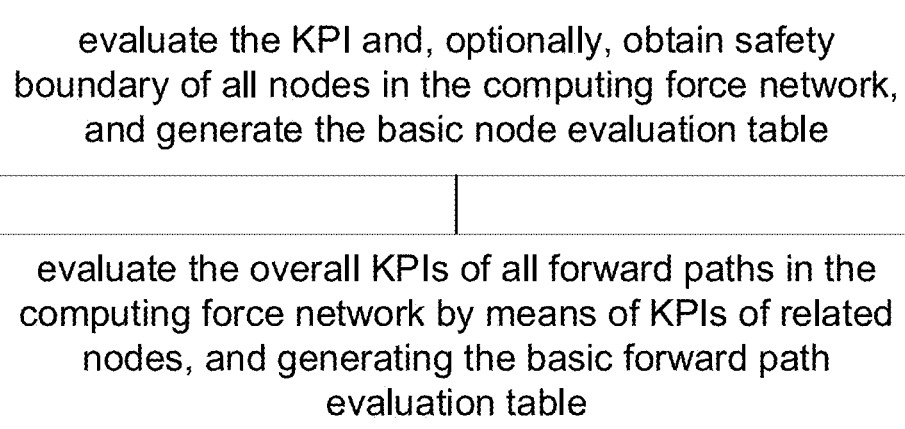
FIG. 8 illustrates a process of generating basic node evaluation table and basic forward path evaluation table according to the embodiments of the present disclosure.

Hereinafter, an embodiment of generating basic node evaluation table and basic forward path evaluation table according to the embodiments of the present disclosure will be described with reference to FIG. 8.

In the process, firstly, use the above node evaluation model to evaluate the KPI and, optionally, obtain security boundary of all nodes in the computing force network, as discussed above, and generate the basic node evaluation table; then, traverse all forward paths between access nodes and computing nodes in the computing force network, for each forward path, searching the related KPIs between forward path nodes and nodes according to the basic node evaluation table to evaluate the overall KPIs of the forward path, and generating the basic forward path evaluation table; then, generate the basic node evaluation table and the basic forward path evaluation table. In particular, the basic node evaluation table and the basic forward path evaluation table can be generated/updated periodically, regularly, or on demand.

Therefore, the present disclosure can generate a basic table for node evaluation, such as by evaluating the resource indicators, KPIs and the safety boundaries of resource consumption of all nodes in the network, and generate a basic table for path evaluation based on the KPIs of the nodes. By looking up two tables, it is possible to quickly evaluate the capabilities of each node and the advantages and disadvantages of each end-to-end forward path. And in consideration of some constraints related to task/business characteristic/requirement, the basic node evaluation table can be used to build an effective forward path library, which can be used to narrow the forward path search range and speed up the search for the optimal scheduling process.

According to some embodiments, resource scheduling in the computing force network for a task/business may include selecting/scheduling optimal forward path(s) from an access node to a computing node in the computing force network for at least one task/business. Such optimal forward path(s) may mean at least one optimal forward path, such as an optimal forward path or a combination of optimal forward paths including a number of forward paths, which can be selected/scheduled based on performance indicators of at least one forward path in the network as evaluated as above in a variety of manners, such as by means of a kind of cost function. In some embodiments, such selection/scheduling can be performed for one task/business, particularly for meeting/satisfying the task/business requirement, and optionally in consideration of possible constraints. In an example, for a task/business, an optimal forward path between an access node and a computing node can be determined from candidate paths included in the network. And in some embodiments, such selection/scheduling can be performed for two or more tasks/businesses, particularly for meeting/satisfying the requirements of two or more tasks/businesses, and optionally in consideration of possible constraints. In an example, for two or more tasks/businesses, a combination of optimal paths may be determined, where the combination of optimal paths may include two or more optimal paths each of which correspond to each task/business, and preferably, such two or more tasks/businesses may be considered as a whole and then the two or more optimal paths may be determined concurrently for optimizing the whole of two or more tasks/businesses, such as making the total cost for the two or more tasks/businesses to be minimal, even each path may not be the most optimal for each individual path.

According to some embodiments of the present disclosure, the selecting the optimal forward path(s) may comprise applying a comprehensive evaluation cost function to the at least one forward path, and selecting appropriate forward path(s) from the at least one forward path by minimizing the comprehensive evaluation cost function as the optimal forward path(s). In some embodiments, the comprehensive evaluation cost function can be modeled as a function comprehensively considering a plurality of factors, and particularly a function of the matching degree of forward path KPI and KPI demand, and business characteristics, such as, forward path risk probability, forward path importance, cost sensitivity, time sensitivity, computing power resource sensitivity, and any other factors.

In some embodiments, the comprehensive evaluation cost function is constituted by weighted combination of performance indicators of forward paths and at least one business characteristics. In an example, for a type of task/business or task/business requirement, a total comprehensive cost function may be $O_k(a_k, KPI_k) = A+B+C+D+E+F$, each item is A: $\lambda_k^{KPI}|g(a_k)-KPI_k|$, indicates the KPI matching degree;

B: $\lambda_k^G \sum_{d \in \mathcal{D}(a_k)} G(d)$, indicates the nodes' importance in the network;

C: $\lambda_k^R \prod_{d \in \mathcal{D}(a_k)} R(d)$, indicates risk-free probability;

D: $\lambda_k^C \sum_{d \in \mathcal{D}(a_k)} C(d)$, indicates cost sensitivity;

E: $\lambda_k^T \sum_{d \in \mathcal{D}(a_k)} T(d)$, indicates time sensitivity;

F: $\lambda_k^{Cr} \sum_{d \in \mathcal{D}(a_k)} CR(d)$, indicates resource sensitivity;

Wherein $\lambda_k^{KPI}, \lambda_k^G, \lambda_k^R, \lambda_k^C, \lambda_k^T, \lambda_k^{CR}$ are the weights of KPI matching degree, network importance, risk, cost sensitivity, time sensitivity and computing power resource sensitivity, respectively, which may be related to the forward path $a_k$, which can be included in a set of candidate forward paths available for such task/business. $g(a_k)$ is the forward path KPI evaluation of the forward path $a_k$, which may be evaluated as above and their values can be found in the basic table of the forward path evaluation.

Therefore, at least one optimal forward path can be selected from the candidate set of forward paths corresponding to the business requirement for minimizing the total comprehensive cost function for the business requirement. For example, each forward path in the candidate set of forward paths can be applied to the total comprehensive cost function to obtain its corresponding function value, and thus at least one forward path which can minimize the total comprehensive cost function would be selected as the optimal forward path. The manner of minimizing a cost function can be any appropriate manner in the art, and will not be described here in detail.

In some embodiments, given n task/business requirements, corresponding KPI requirements and a forward path library A, for one forward path $a \in A$, the collection of all nodes in the forward path is represented by D(a), and a total comprehensive cost function for such n task/business requirements is $\sum_{k=1}^{n} O_k(a_k, KPI_k)$. accordingly, the optimal resource scheduling strategy is to choose a forward path combination $(a_1, \ldots, a_n)$ which can minimize $\sum_{k=1}^{n} O_k(a_k, KPI_k)$.

In particular, such forward path combination can be obtained in any appropriate manner. In an example, each task/business requirement can be minimized separately, and particularly, for $k_{th}$ of n task/business requirements, its corresponding optimal forward path $a_k$ can be determined or selected from its candidate forward paths for its corresponding task/business, as described above, and then for each task/business requirement, its corresponding optimal forward path can be obtained and then combined to obtain the forward path combination $(a_1, \ldots, a_n)$. In another example, the task/business requirements can be minimized as a whole. In particular, each forward path in a set of candidate forward paths corresponding to $k_{th}$ task/business can be substituted into the corresponding $k_{th}$ $O_k(a_k,KPI_k)$ included in the expression $\Sigma_{k=1}^{n}O_k(a_k,KPI_k)$, that is, in a round of calculation, n forward paths are utilized, wherein for a task/business requirement, any one forward path included the corresponding candidate forward paths can be utilized in its corresponding part of cost function, and then the value of the total comprehensive cost function $\Sigma_{k=1}^{n}O_k(a_k,KPI_k)$ can be determined. So that by means of a plurality of rounds of calculation, the forward path combination for minimizing the total comprehensive cost function can be find as the optimal forward path combination.

In some embodiments, the weights for the at least one business characteristics can be set in accordance with the business requirement. In particular, different weights can be set to reflect different business requirements. Therefore, for a task/business, the weight of each factor in the comprehensive cost function can be set according to the performance requirement of the task/business, and then the cost function can be applied to performance indicators of at least one forward path as evaluated above can be applied to find specific forward path(s), which can cause the cost of the performance evaluation cost function to be minimum, as the optimal forward path(s).

In particular, not all the above factors, particularly the above B, C, D, E, F, may be included in the function, which can be implemented by setting the corresponding weights, such as setting the weights to be zero.

In an example, a cost-sensitive task/business chooses a forward path with the lowest cost to meet business needs. Let $\lambda_k^{T}=0$, $\lambda_k^{CR}=0$.

In another example, a time-sensitive task/business chooses a forward path with the lowest latency to meet the business needs. Let $\lambda_k^{C}=0$, $\lambda_k^{CR}=0$.

In yet another example, a computing resource-sensitive task/business chooses a forward path with abundant computing resources to meet business needs. Let $\lambda_k^{C}=0$, $\lambda_k^{T}=0$.

Figure 10A:
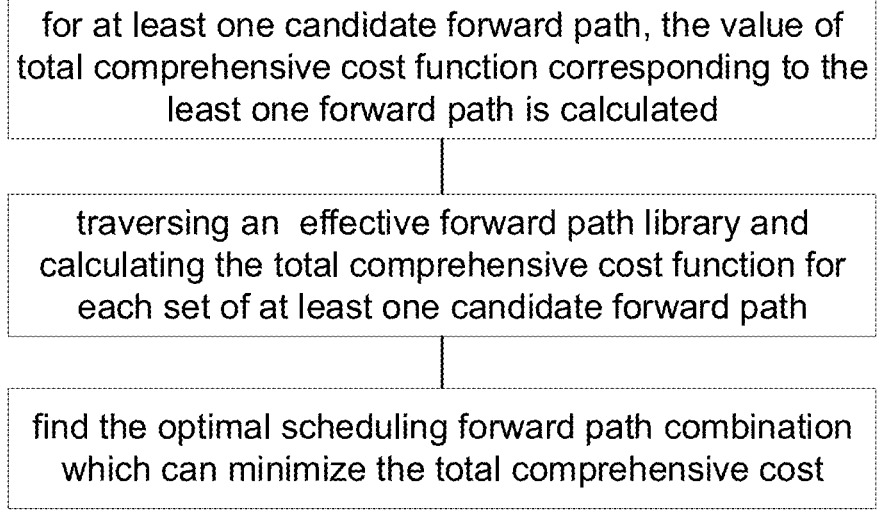
FIGS. 10A and 10B illustrate processes for selecting optimal forward path(s) in a computing force network according to the embodiments of the present disclosure.

Hereinafter, an embodiment of acquiring optimal forward path(s) for resource scheduling in the computing force network according to the embodiments of the present application will be described with reference to FIG. 10A.

First, for at least one candidate forward path $(a_1, \ldots, a_n)$, i.e., a forward path combination, the value of total comprehensive cost function $\Sigma_{k=1}^{n}O_k(a_k,KPI_k)$ corresponding to the least one forward path can be calculated by applying the at least one forward path to the cost function; then, traversing the effective forward path library and calculating the total comprehensive cost function for each path and path combination; finally, find the optimal resource scheduling forward path combination $(a_1, \ldots, a_n)$ to minimize the total comprehensive cost $\Sigma_{k=1}^{n}O_k(a_k,KPI_k)$.

The present disclosure provides a comprehensive cost function based on multi-dimensional information, such as KPI matching degree, nodes' importance in the network, risk factor and so on but not limited to this, to quantify various task requirements, such as cost-sensitive, time-sensitive, computing resource-sensitive and so on but not limited to this. For different KPI requirements, it is not necessary to reconstruct the cost function, only needs to adjust its factor weight. At the same time, the comprehensive cost function can find the optimal solution by means of mature optimization algorithms, particularly loss function optimization, cost function optimization, etc., Because this technology fully considers multi-party information and uses mature methods to solve it, the optimal resource scheduling strategy is reliable and stable.

According to some embodiments, the at least one forward path, from which the at least one optimal forward path is selected, can correspond to a candidate forward path library, and such a candidate forward path library can be established from all forward paths in the computing force network in a variety of manners. In an example, the at least one forward path may be all forward paths included in the computing force network. In another example, the at least one forward path can be selected from all forward paths based on some constraints, requirement, criteria, and so on.

In some embodiments, for a task/business, the at least one node and at least one forward path to be evaluated can be determined based on constraints for a specific business, and, wherein the constraints for a specific business may include at least one of access node constraint, computing node constraint, forward path load constraint. For example, the constraints for access node can determine which access node(s) shall carry out the business.

Figure 9:
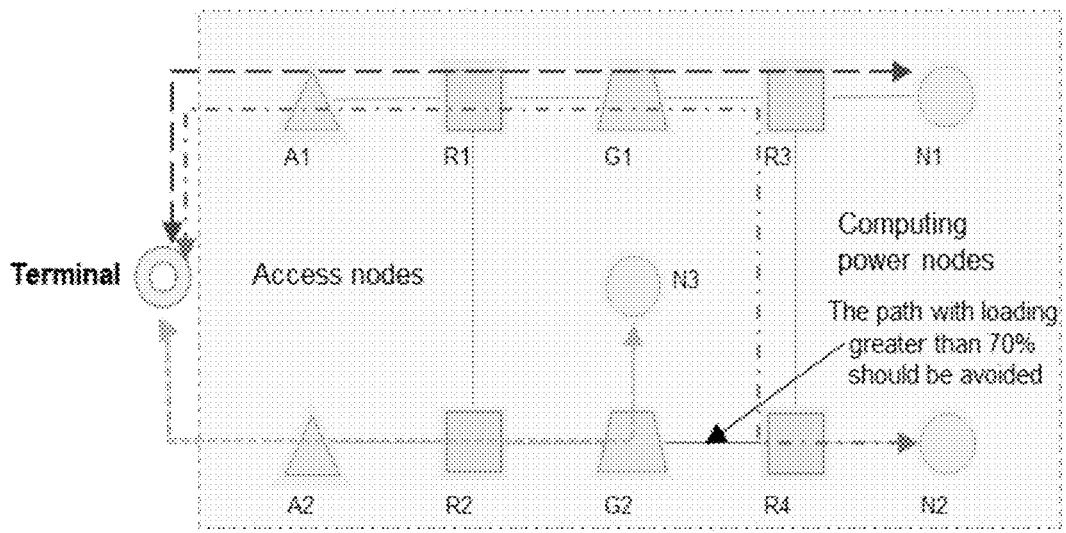
FIG. 9 illustrates an exemplary topical structure of a computing force network according to the embodiments of the present disclosure.

Hereinafter an example of establishment of candidate forward path library will be described hereinafter. According to service business requirements and service access nodes, single or multiple available forward paths from terminal access nodes, single or multiple available forward paths from terminal access nodes to computing nodes can be obtained based on network information and a basic node evaluation table, and an effective forward path library is formed. As shown in FIG. 9, given the business requirement, a business flow accessing to the node A1 must be carried by the node G1, a business flow accessing to the node A2 must be carried by the node G2. If the load of link G2<->R4 exceeds 70%, forward paths that include this link should be avoided. The corresponding candidate library can be established as shown in the following table:

TABLE 3

|  | Computing node N1 | Computing node N2 | Computing node N3 |
|---|---|---|---|
| Access node A1 | Path 1: {A1<->R1<->G1<->R3<->N1} | Path 1: {A1<->R1<->G1<->R3<->R4<->N2} | Null |
| Access node A2 | Null | Null | Path 1: {A1<->R2<->G2<->N3} |

Figure 10B:
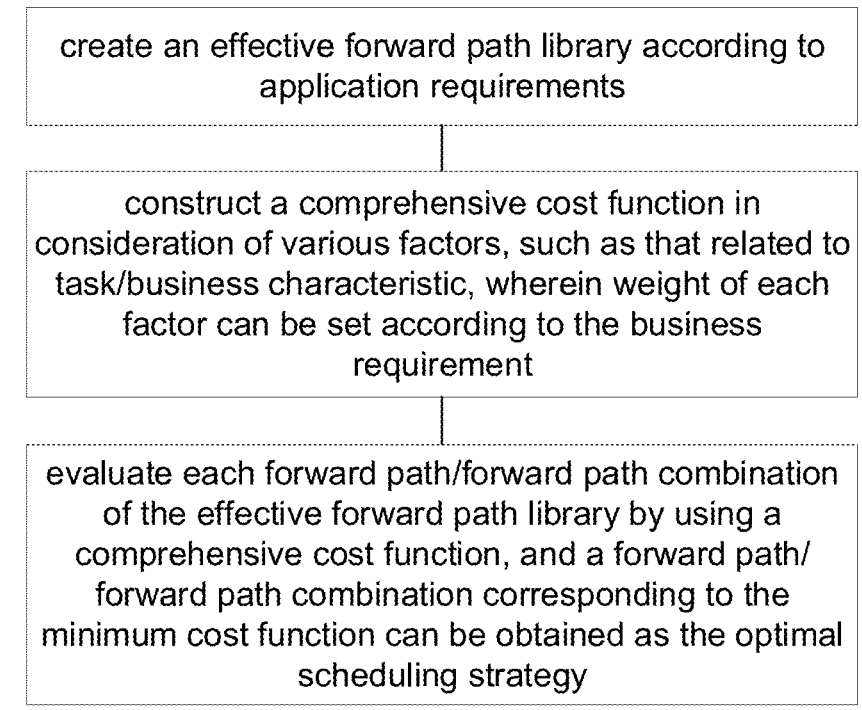

Hereinafter, an embodiment of acquiring an optimal path/path combination for resource scheduling in the computing force network according to the embodiments of the present application will be described with reference to FIG. 10B.

Firstly, create an effective forward path library according to application requirements, such effective forward path library can be all forward paths in the network, or can be candidate forward paths which are set in consideration of some constraints as above.

Then, construct a comprehensive cost function in consideration of various factors, such as that related to task/business characteristic, and that weight of each factor can be set according to the business requirement, as discussed above.

Then, evaluate each path/path combination of the effective forward path library by using a comprehensive cost function, and a path/path combination corresponding to the minimum cost function can be obtained as the optimal resource scheduling strategy.

Note that the usage of comprehensive cost function and the performance evaluation for nodes and forward paths as discussed above can be utilized separately, or can be combined. In the former case, the performance evaluation for nodes and forward paths can be performed as discussed above, and then a cost function well known in the art can be utilized, or the performance evaluation for nodes and forward paths can be performed in a conventional manner, and then the comprehensive cost function according to the embodiments of the present disclosure can be utilized. In the latter case, the performance evaluation for nodes and forward paths can be performed as discussed above, and then a comprehensive cost function according to the present disclosure can be utilized.

Figure 11:
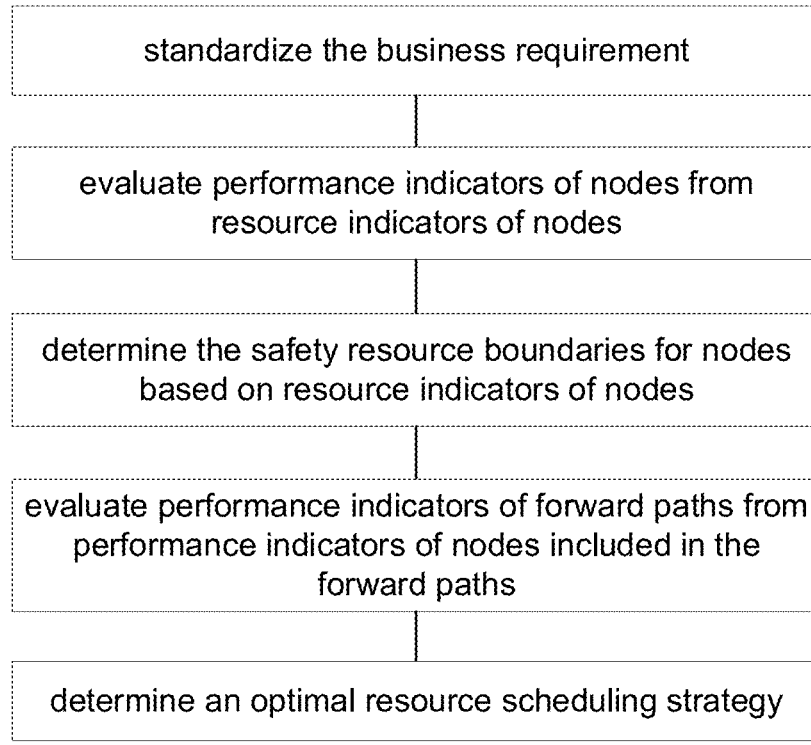
FIG. 11 illustrates a flowchart which generally shows scheduling of resources for a computing force network according to the embodiments of the present disclosure.

Hereinafter, some embodiments of the present disclosure related to exemplary resource scheduling of the computing force network will be described with reference to FIG. 11, which illustrate a flowchart of the overall process for resource scheduling the computing force network according to embodiments of the present disclosure.

The first step of the overall process is to standardize the business requirement, and particularly map the current business SLA to standardize computing power KPI and network KPI.

For example, for an application to which the solution of the present application is employed, Service Level Agreement (SLA) of the service/business can be utilized to derive KPI for the computing force network or nodes therein. SLA may indicate KPI experienced by the user, such as bandwidth, latency, lost connection rate, etc. The following table schematically shows the SLA requirements for the computing nodes and the computing force network.

As an example, the mapping of business SLA to standardized computing power KPI and network KPI is shown in the following table.

TABLE 4

| | SLA requirement for computing power | | | | | | | | | | | |
|---|---|---|---|---|---|---|---|---|---|---|---|---|
| | Available business (single application) | | | | | | | Security and reliability Logic isolation: shareable Physical isolation: exclusive | | Self-control viewable: get the business and user information; manageable: modify business, manage life cycle; operable: global operationy API | | |
| | computing (TFLOPS) | | | | storage (MB) | | | | | | | |
| | CP1 | Cp2 | Cp3 | Cp4 | St1 | St2 | St3 | Ss1 | Ss1 | Mn1 | Mn2 | Mn3 |
| Business type | <1 | 1~10 | 10-1000 | >1000 | <100 | 100-1000 | >1000 | Logic isolation | Physical isolation | Visible | manageable | operable |
| Business/requirement | | Y | Y | | | Y | | Y | | Y | Y | Y |

| | network SLA requirement | | | | | | | | | | | |
|---|---|---|---|---|---|---|---|---|---|---|---|---|
| | Available business (single user, single business) | | | | | | | Security and reliability Logic isolation: shareable Physical isolation: exclusive | | Self-control viewable: get the business status and user information; manageable: modify business, mange life cycle; operable: global operatoin by API | | |
| | bandwidth (mps) | | | | | latecy (us) | | | | | | |
| | B1 | B2 | B3 | B4 | B5 | T1 | T2 | T3 | T4 | T5 | | |
| | 1~10 | 1~20 | 20~50 | 50~100 | >100 | 50~100 | 20~50 | 10~20 | 5~10 | <5 | | |
| | | | | | | | | | | | S1 | S2 |
| | | | | | | | | | | | Logic isolation | Physical isolation |
| | | | | | | | | | | | M1 | M2 | M3 |
| Business type | | | | | | | | | | | Viewable | Manageable | Operable |
| Business/requirement | | | Y | Y | | | Y | | | | Y | Y | Y |

Then, perform the performance evaluation of the nodes included in the computing network. Such performance evaluation can be directed to all nodes in the computing network, and thus a basic node evaluation table can be generated; and alternatively, such performance evaluation can mainly performed for specific nodes which may be required/constrianted by the application/business, for example, an access node which is required to carry the data stream of the application/business, and thus other access nodes in the computing force network which may be associated with the access node and form forward paths in the computing force network.

The performance evaluation of the nodes may first include acquiring performance indicator of nodes from the resource indicators of nodes, and particularly may acquiring performance indicator of nodes by employing a function or an evaluation model to the resource indicators of nodes, as described above. According to the resource information and network topology information of the computing force network, the function or model mapping relationship between the resource information of the computing force network node and the performance indicator (KPI) is constructed.

And the performance evaluation of the node may further include determining constraints about resource consumption for the node, that is, the safety resource boundary with reference to inflection KPI points on the relationship curve between the resource and KPI of the node, as described above. In an example, the safety boundary of all computing force network nodes and the statistics of historical resource consumption and performance indicators are traversed to generate the basic table for computing force network node evaluation.

Then, the performance evaluation of forward paths included in the computing force network are performed based on the performance evaluation of nodes included in the forward path. In one implementation, such performance evaluation of forward paths may be performed for all forward paths included in the computing force network, so that a basic forward path evaluation table can be generated for the whole of the network. In another implementation, such performance evaluation of forward paths can be performed for some specific forward paths acquired/constrained by the business requirement, such as forward paths constituted by nodes included in the computing force network based on constraints of the business, such as constraints on access nodes, load constraints on the forward path, etc, so that the performance evaluation can be performed for a small number of nodes and forward paths in the computing force network, and the processing/computation overhead can be reduced to some extent. In other words, before the performance evaluation of nodes and forward paths in the computing network, specific nodes and forward paths may be acquired/determined in consideration of the business characteristics, such as constraints of the business, so that the performance evaluation can be mainly performed with respect to such acquired/determined specific nodes and forward paths, instead of all possible nodes and forward paths in the computing force network.

Then, an optimal resource scheduling strategy is determined for a task/business, and particularly, at least one optimal forward path, for example, an optimal forward path or an optimal combination of forward paths, can be acquired based on the performance evaluation of forward paths. In particular, a comprehensive cost function can be created based on the performance evaluation of the forward paths as well as acquirements of the business, and then by means of such a comprehensive cost function, at least one forward path which causes the cost of the function to be minimum can be acquired as the at least one optimal forward path for satisfying the business requirement.

In one implementation, based on the application requirements, by searching the basic table of node evaluation and the basic table of forward path evaluation, one or more optional forward paths from the application end to the calculation node can be obtained as the effective forward path library. The comprehensive cost function is used to evaluate each candidate forward path from the effective forward path library, and the forward path with the minimum comprehensive cost function is selected as the optimal resource scheduling strategy.

Hereinafter a device/apparatus for resource scheduling of a computing force network according to some embodiments of the present disclosure will be described, and such device/apparatus can be implemented in a variety of manners.

In some embodiments, the device/apparatus can include a processing forward path configured to for each of the at least one node included in the computing force network, acquire node performance indicator of the node based on resource indicators of the node and at least one influence node related to the node; for each of the at least one forward path included in the computing force network, acquire forward path performance indicator of the forward path based on the performance indicators of nodes constituting the forward path; and in response to a business requirement for the computing force network, select at least one optimal forward path from the at least one forward path based on the forward path performance indicators of the at least one forward path.

Note that such processing circuit can be configured to implement the process/operations of the method according to the present disclosure.

The resource scheduling device/apparatus can be implemented in a variety of manners. In an example, the resource scheduling device/apparatus according to the present disclosure, particular its processing circuit, may include units for performing operations performed by the processing circuit as described above, as shown in FIG. 12, which illustrates a schematic block view of the resource scheduling device/apparatus according to an embodiment of the present disclosure.

Figure 12:
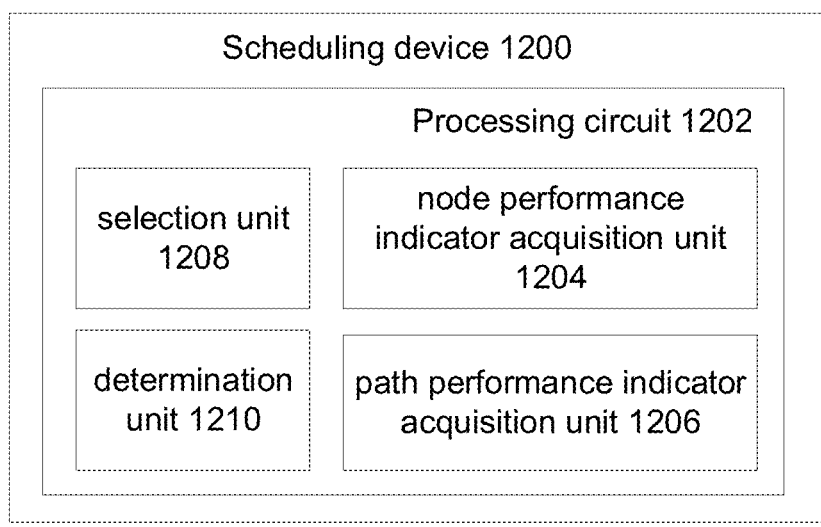
FIG. 12 illustrates a block view of an electronic device for resource scheduling in a computing force network according to the embodiments of the present disclosure.

As shown in FIG. 12, in the resource scheduling device/apparatus 1200, the processing circuit 1202 may include a node performance indicator acquisition unit 1204 configured to, for each of the at least one node included in the computing force network, acquire node performance indicator of the node based on resource indicators of the node and at least one influence node related to the node; a forward path performance indicator acquisition unit 1206 configured to, for each of the at least one forward path included in the computing force network, acquire forward path performance indicator of the forward path based on the performance indicators of nodes constituting the forward path; and a selection unit 1208 configured to, in response to a business requirement for the computing force network, select at least one optimal forward path from the at least one forward path based on the forward path performance indicators of the at least one forward path.

In an embodiment, the node performance indicator acquisition unit 1204 is further configured to perform performance evaluation by a performance evaluation model from resource indicators of the node and the at least one influence node to obtain an evaluation result as the node performance indicator of the node. In an implementation, such performance evaluation can be performed by an evaluation unit which may be included in the node performance indicator acquisition unit 1204.

In an embodiment, the node performance indicator acquisition unit 1204 may include an influence node selection unit which can, for a node whose node performance indicator is to be acquired, select its at least one influence node from nodes in the computing force network based on correlation between the node and other nodes in the computing force network. Such correlation and selection of the influence nodes can be that as described above. Note that such influence nodes can be obtained by any other component, such as a component outside of the unit 1204, a component outside of the processing circuit 1202, even a component outside of the device 1200, and then can be inputted into the unit 1204.

In some embodiments, the processing circuit 1202 may include a determination unit 1210 which is configured to, for each of the at least one node, determine a resource constraint for the node based on correspondence between resource indicators and performance indicators of the node. Note that such determination unit can be outside of the processing circuit and be included in the device 1200, or even outside of the device 1200, and the determined resource constraints can be associated with the nodes, such as constituting a node table.

In some embodiments, the determination unit 1210 can be configured to acquire a correspondence curve between resource indicators and performance indicators of the node, and acquire a resource value corresponding to a specific performance indicator point on the curve as the resource constraint for the node, wherein the specific performance indicator point corresponds to a specific performance inflection point in the curve under a condition that the slope of the curve changes, or corresponds to a performance threshold point in the curve under a condition that the curve is linear.

In some embodiments, the path performance indicator acquisition unit 1206 may include a combination unit which is configured to combine the performance indicators of all nodes included in the forward path to acquire the overall forward path performance indicator of the forward path.

In some embodiments, a node performance indicator of a node may comprise at least one component corresponding to at least one type of performance characteristics, and the combination unit may be configured to combine the respective performance indicator components of the nodes in respective manners set in accordance with the respective performance characteristics.

In some embodiments, the selection unit may be configured to apply the at least one forward path to a comprehensive evaluation cost function, and select at least one optimal forward path from the at least one forward path by minimizing the comprehensive evaluation cost function.

It should be noted that although the units are shown in the processing circuit 1202, it is only exemplary, and at least one of such units also can be outside of the processing circuit, even out of the service provider. Each of the above units is only a logical module divided according to a specific function implemented by it, instead of being used to limit a specific implementation manner, and for example, such units as well as the processing circuit and even the service provider may be implemented in software, hardware, or a combination of software and hardware. In an actual implementation, the foregoing units may be implemented as independent physical entities, or may be implemented by a single entity (for example, a processor (Central Processing Unit (CPU) or Digital Signal Processor (DSP), etc.), an integrated circuit, etc.). In addition, the above-mentioned respective units are shown with dashed lines in the drawings to indicate that these units may not actually exist, and the operations/functions they implement may be realized by the processing circuitry itself.

It should be understood that FIG. 12 is merely a schematic structural configuration of the resource scheduling device/apparatus, and optionally, the resource scheduling device/apparatus may further include other possible components not shown, such as a memory, a radio frequency stage, a baseband processing unit, a network interface, a controller, and the like. The processing circuit may be associated with a memory and/or an antenna. For example, the processing circuit may be directly or indirectly (e.g., other components may be connected in between) connected to the memory for data access. Also, for example, the processing circuit may be directly or indirectly connected to the antenna to transmit signals via the communication unit and receive radio signals via the communication unit.

The memory may store various kinds of information, for example, model training and model evaluation related information generated by the processing circuit 1202, as well as programs and data for operation by the scheduling device, data to be transmitted by the scheduling device, and the like. The memory may also be located inside the scheduling device but outside of the processing circuit, or even outside of the scheduling device. The memory may be a volatile memory and/or a non-volatile memory. For example, the memory may include, but is not limited to, random access memory (RAM), dynamic random-access memory (DRAM), static random-access memory (SRAM), read-only memory (ROM), and flash memory.

It should be noted that the above description is only exemplary. The embodiments of the present disclosure can also be executed in any other appropriate manner, and the advantageous effects obtained by the embodiments of the present disclosure can still be achieved. Moreover, the embodiments of the present disclosure can also be applied to other similar application examples, and the advantageous effects obtained by the embodiments of the present disclosure can still be achieved. It should be understood that machine-executable instructions in the machine-readable storage medium or program product according to the embodiments of the present disclosure may be configured to perform operations corresponding to the above-mentioned device and method embodiments. When referring to the above embodiments of the device and method, the embodiments of the machine-readable storage medium or the program product are clear to those skilled in the art, and therefore will not be described repeatedly. Machine-readable storage media and program products for carrying or including the aforementioned machine-executable instructions also fall within the scope of the present disclosure. Such a storage medium may include, but is not limited to, a floppy disk, an optical disk, a magneto-optical disk, a memory card, a memory stick, and the like.

Figure 13:
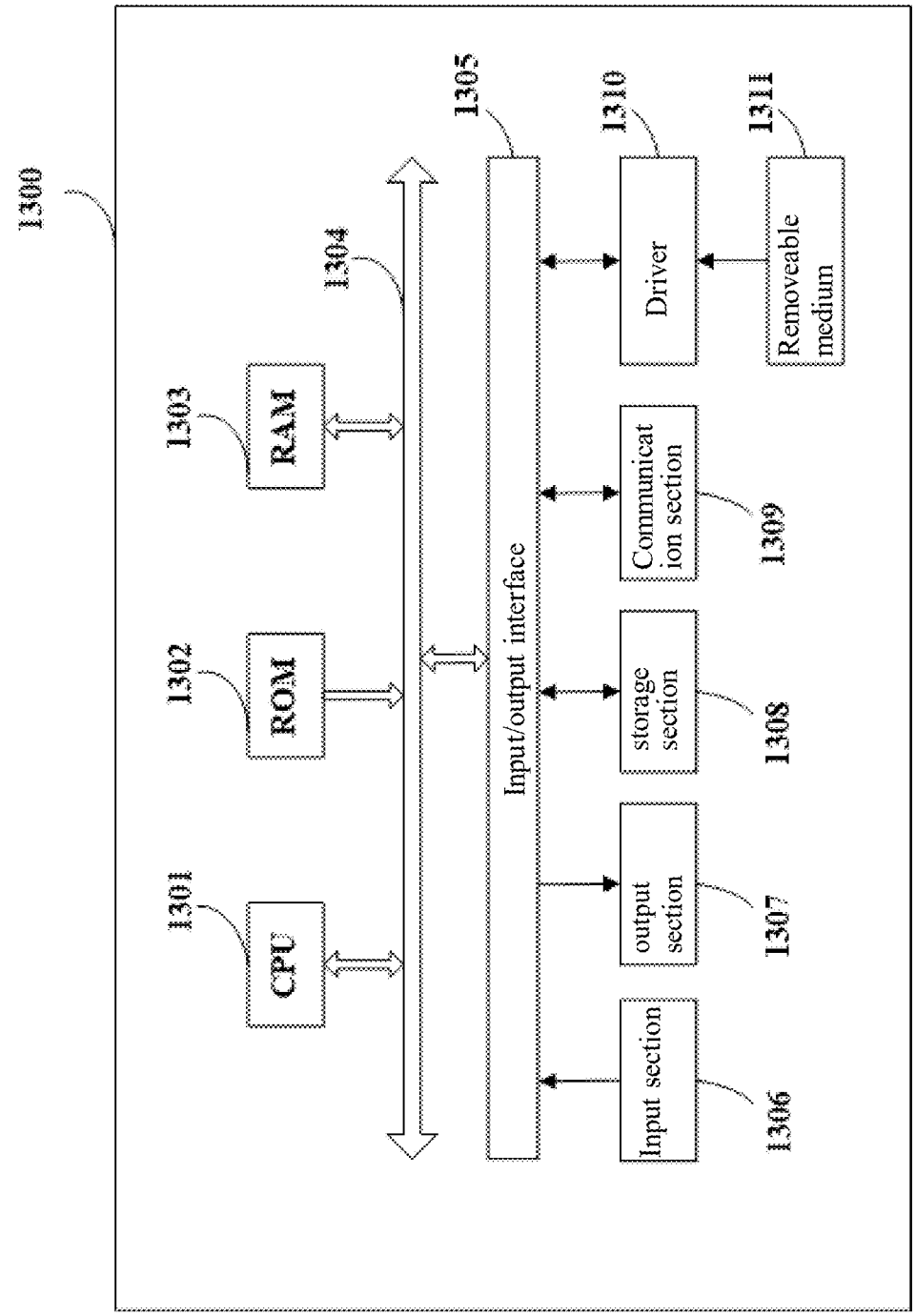
FIG. 13 illustrates an outline of a computer system in which embodiments according to the present disclosure may be implemented.

In addition, it should be understood that the series of processes and devices as described above may also be implemented by software and/or firmware. In the case of being implemented by software and/or firmware, a corresponding program constituting the corresponding software is stored in a storage medium of the related device, and when the program is executed, various functions can be achieved. As an example, a program constituting the software can be installed from a storage medium or a network to a computer having a dedicated hardware structure, such as a general-purpose computer 1300 shown in FIG. 13, and the computer is capable of executing various functions and so on when various programs are installed. FIG. 13 is a block diagram showing an exemplary structure of a computer as an example of an information processing apparatus that can be employed in an embodiment according to the present disclosure. In one example, the computer may correspond to the above-described exemplary electronic device on the AI platform side or the electronic device on the application side according to the present disclosure.

In FIG. 13, central processing unit (CPU) 1301 performs various processes according to a program stored in a read only memory (ROM) 1302 or a program loaded from a storage section 1308 to a random access memory (RAM) 1303. In the RAM 1303, data required when the CPU 1301 executes various processes and the like is also stored as necessary.

The CPU 1301, the ROM 1302, and the RAM 1303 are connected to each other via a bus 1304. An input/output interface 1305 is also connected to the bus 1304.

The following components are connected to the input/output interface 1305: the input section 1306 including a keyboard, a mouse, etc.; the output section 1307 including a display, such as a cathode ray tube (CRT), a liquid crystal display (LCD), etc. and a speaker, etc.; the storage section 1308 including hard disks, etc.; and communication section 1309 including network interface cards such as LAN cards, modems, etc. The communication section 1309 performs communication processing via a network such as the Internet.

The driver 1310 can also be connected to the input/output interface 1305 as needed. The removable medium 1311 such as a magnetic disk, an optical disk, a magneto-optical disk, a semiconductor memory, etc. is installed on the driver 1310 as needed, so that a computer program read out therefrom is installed into the storage section 1308 as needed.

In the case where the above-mentioned series of processing is realized by software, a program constituting the software is installed from a network such as the Internet or a storage medium such as a removable medium 1311.

Those skilled in the art should understand that a storage medium is not limited to the removable medium 1311 shown in FIG. 13 in which the program is stored and which is distributed separately from the device to provide the program to the user. Examples of removable media 1311 include magnetic disks (including floppy disks), optical disks (including CD-ROMs and digital versatile disks (DVDs)), magneto-optical disks (including mini disks (MD) ™) and semiconductor memory. Alternatively, the storage medium may be ROM 1302, a hard disk included in the storage portion 1308, and the like, in which programs are stored, and are distributed to users along with the device containing them.

In addition, it should be understood that multiple functions included in one unit in the above embodiments may be implemented by separate devices. Alternatively, multiple functions implemented by multiple units in the above embodiments may be implemented by separate devices, respectively. In addition, one of the above functions can be implemented by multiple units. Needless to say, such configuration is included in the technical scope of the present disclosure.

Herein, the steps illustrated in the flowchart include not only processes performed in the described order in time series, but also processes performed in parallel or individually instead of having to be performed in time series. Further, even in the steps processed in time series, needless to say, the order can be appropriately changed.

Although the present disclosure and its advantages have been described in detail, it should be understood that various changes, substitutions and alterations can be made hereto without departing from the spirit and scope of the present disclosure as defined by the appended claims. Moreover, the terms "including", "comprising", or any other variation thereof, of the embodiments of the present disclosure are intended to cover non-exclusive inclusion, so that a process, method, article, or device that includes a series of elements includes not only those elements, but includes other elements not explicitly listed, or also elements inherent to such a process, method, article, or device. Without more restrictions, the elements defined by the sentence "including a . . . " do not exclude a case that in the process, method, article, or device that includes the elements, other identical elements exist.

Although some specific embodiments of the present disclosure have been described in detail, those skilled in the art should understand that the above embodiments are merely illustrative and do not limit the scope of the present disclosure. Those skilled in the art should understand that the above embodiments may be combined, modified, or replaced without departing from the scope and essence of the present disclosure.

What claimed is:

1. A method of resource scheduling in a computing force network, wherein the computing force network comprises at least one node among which at least one forward path exists, and the method comprises the following steps:
   for each of the at least one node included in the computing force network, acquiring node performance indicator of the node based on resource indicators of the node and at least one influence node related to the node;
   for each of the at least one forward path included in the computing force network, acquiring forward path performance indicator of the forward path based on the performance indicators of nodes constituting the forward path; and
   in response to a business requirement for the computing force network, selecting at least one optimal forward path from the at least one forward path based on the forward path performance indicators of the at least one forward path,
   wherein, the method further comprises: for each of the at least one node,
   acquiring a correspondence curve between resource indicators and performance indicators of the node, and
   acquiring a resource value corresponding to a specific performance indicator point on the curve as a resource constraint for the node,
   wherein the specific performance indicator point corresponds to a specific performance inflection point in the curve under a condition that the slope of the curve changes, or corresponds to a performance threshold point in the curve under a condition that the curve is linear.

2. The method of claim 1, wherein acquiring node performance indicator of the node comprises performing performance evaluation by a performance evaluation model from resource indicators of the node and the at least one influence node to obtain an evaluation result as the node performance indicator of the node.

3. The method of claim 1, wherein for a node whose node performance indicator is to be acquired, it's at least one influence node is selected from nodes in the computing force network based on correlation between the node and other nodes in the computing force network, and wherein the correlation between the node and other nodes in the computing force network may include at least one of position correlation, link/path correlation, community correlation between the node and other nodes in a topological structure of the computing force network.

4. The method of claim 1, wherein the resource constraint for the node corresponds to maximum resources available by the node which would cause the performance of the node to reach a performance threshold or would not cause the performance of the node to degrade to a level where a safety of the computing force network is caused to be compromised.

5. The method of claim 1, wherein the performance inflection point in the curve corresponds to a critical value of the slope change of the curve determined based on the probability distribution of the slope of the smoothed relationship curve, and/or
wherein the performance threshold point corresponds to an empirically set performance threshold point in the curve.

6. The method of claim 1, wherein acquiring forward path performance indicator of the forward path comprises:
combining the performance indicators of all nodes included in the forward path to acquire the overall forward path performance indicator of the forward path.

7. The method of claim 6, wherein a node performance indicator of a node comprises at least one component corresponding to at least one type of performance characteristics, and wherein combining the performance indicators of all nodes comprises:
combining the respective performance indicator components of the nodes in respective manners set in accordance with the respective performance characteristics.

8. The method of claim 1, wherein selecting the optimal forward path comprises:
applying each of the at least one forward path to a comprehensive evaluation cost function, and
selecting a forward path from the at least one forward path by minimizing the comprehensive evaluation cost function as the optimal forward path.

9. The method of claim 8, wherein the comprehensive evaluation cost function is constituted by weighted combination of performance indicators of forward paths and at least one business characteristics.

10. A device comprising:
one or more processors; and
one or more storage media storing instructions that, when executed by the one or more processors, cause the one or more processors to:
for each of at least one node included in the computing force network, acquiring node performance indicator of the node based on resource indicators of the node and at least one influence node related to the node;
for each of at least one forward path included in the computing force network, acquiring forward path performance indicator of the forward path based on the performance indicators of nodes constituting the forward path; and
in response to a business requirement for the computing force network, selecting at least one optimal forward path from the at least one forward path based on the forward path performance indicators of the at least one forward path,
wherein the instructions further comprise instructions that, when executed by the one or more processors, cause the one or more processors to: for each of the at least one node,
acquiring a correspondence curve between resource indicators and performance indicators of the node, and
acquiring a resource value corresponding to a specific performance indicator point on the curve as a resource constraint for the node,
wherein the specific performance indicator point corresponds to a specific performance inflection point in the curve under a condition that the slope of the curve changes, or corresponds to a performance threshold point in the curve under a condition that the curve is linear.

11. The device of claim 10, wherein acquiring node performance indicator of the node comprises performing performance evaluation by a performance evaluation model from resource indicators of the node and the at least one influence node to obtain an evaluation result as the node performance indicator of the node.

12. The device of claim 10, wherein the resource constraint for the node corresponds to maximum resources available by the node which would cause the performance of the node to reach a performance threshold or would not cause the performance of the node to degrade to a level where a safety of the computing force network is caused to be compromised.

13. The device of claim 10, wherein acquiring forward path performance indicator of the forward path comprises:
combining the performance indicators of all nodes included in the forward path to acquire the overall forward path performance indicator of the forward path.

14. The device of claim 10, wherein selecting the optimal forward path comprises:
applying each of the at least one forward path to a comprehensive evaluation cost function, and
selecting a forward path from the at least one forward path by minimizing the comprehensive evaluation cost function as the optimal forward path.

15. A computer-readable storage medium storing instructions that, when executed by one or more processors, cause the one or more processors to:
for each of at least one node included in the computing force network, acquiring node performance indicator of the node based on resource indicators of the node and at least one influence node related to the node;
for each of at least one forward path included in the computing force network, acquiring forward path performance indicator of the forward path based on the performance indicators of nodes constituting the forward path; and
in response to a business requirement for the computing force network, selecting at least one optimal forward path from the at least one forward path based on the forward path performance indicators of the at least one forward path,
wherein the instructions further comprise instructions that, when executed by the one or more processors, cause the one or more processors to: for each of the at least one node,
acquiring a correspondence curve between resource indicators and performance indicators of the node, and
acquiring a resource value corresponding to a specific performance indicator point on the curve as a resource constraint for the node, wherein the specific performance indicator point corresponds to a specific performance inflection point in the curve under a condition that the slope of the curve changes, or corresponds to a performance threshold point in the curve under a condition that the curve is linear.

16. The computer-readable storage medium of claim 15, wherein acquiring node performance indicator of the node comprises performing performance evaluation by a performance evaluation model from resource indicators of the node and the at least one influence node to obtain an evaluation result as the node performance indicator of the node.

17. The computer-readable storage medium of claim 15, wherein acquiring forward path performance indicator of the forward path comprising:
   combining the performance indicators of all nodes included in the forward path to acquire the overall forward path performance indicator of the forward path.

18. The computer-readable storage medium of claim 15, wherein selecting the optimal forward path comprises:
   applying each of the at least one forward path to a comprehensive evaluation cost function, and
   selecting a forward path from the at least one forward path by minimizing the comprehensive evaluation cost function as the optimal forward path.

* * * * *